July 30, 1929.  W. S. REIBER  1,722,396

MILK BOTTLE

Filed Feb. 13, 1928

INVENTOR.
WINFIELD S. REIBER
BY
E. G. Charles
ATTORNEY.

Patented July 30, 1929.

1,722,396

UNITED STATES PATENT OFFICE.

WINFIELD S. REIBER, OF TOPEKA, KANSAS.

MILK BOTTLE.

Application filed February 13, 1928. Serial No. 254,003.

My invention relates to improvements in milk bottles.

The object of my invention is to provide a milk bottle whereby the cream may be removed independently of the milk.

A further object of my invention is to provide a milk bottle having a division positioned at the line of demarkation of the cream and milk.

A still further object of my invention is to provide a division in a milk bottle, the division integrally connected thereto and having an opening at one side thereof.

A still further object of my invention is to provide a milk container having an apertured cross partition so arranged that the cream rising on the milk will be guided to the aperture by reason of the lower side of the partition being slantingly positioned toward the aperture.

These and other objects will hereinafter be more fully explained, reference being had to the accompanying drawings forming a part of this specification, in which like characters will apply to like parts throughout the different views.

Referring to the drawings.

The invention herein disclosed consists of a milk bottle 1 which is of the usual type employed by dairymen. Positioned in the bottle at a point beneath the usual amount of cream that will arise from the contents, is a partition or division member 2, the top portion of which is parallel to the bottom of the bottle, while the under side thereof as at A is slantingly positioned, the object of which is that the cream in the milk in the lower portion of the bottle will contact with the under side of the partition and follow therealong to an opening 3 through which it will pass to the upper side of the partition, as at B.

Figure 1:
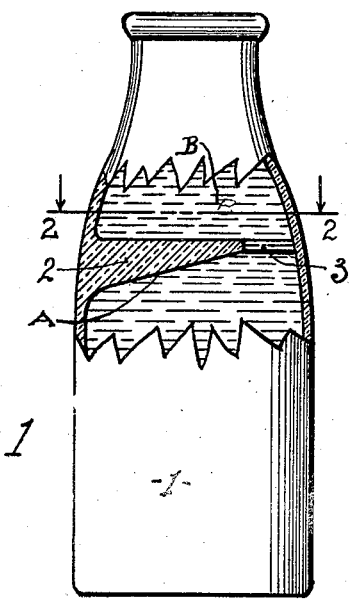
Fig. 1 is an elevation of the bottle partly in section, taken on line 1—1 in Fig. 2, looking in the direction of the arrows.
Figure 2:
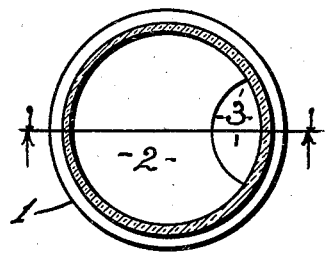
Fig. 2 is a cross section taken on line 2—2 in Fig. 1.
Figure 3:
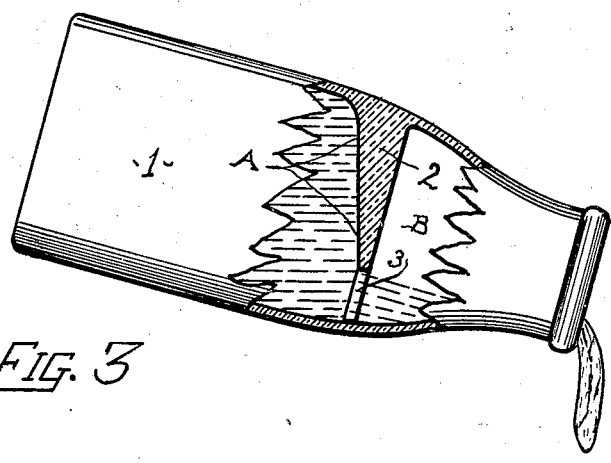
Fig. 3 is a view of the bottle partly in section, and being tilted to show the possibility of removing the cream in the upper portion of the bottle independent of the milk in the lower portion.

The object of placing the opening at one side and having an arcuate form for the inner wall thereof is that by tilting the bottle as shown in Fig. 3 the cream deposit will seal the opening until practically all of the cream has been removed, without disturbing the milk in the lower portion of the bottle.

To pour the milk from the lower portion after the cream has been removed, it is preferable to invert the position of the bottle to that shown in Fig. 3. The milk is then free to pass outward through the opening without excess bubbling to replace the vacuum.

Should the bottle be partially filled with milk—that is to say, all of the milk being contained below the partition—it is found that the cream deposit, which is at the top, may be easily separated from the milk by turning the bottle with the opening on the upper side and tilting it, by which means the cream may be removed prior to the milk.

While I have shown the partition being integral with the walls of the bottle, it is possible to make the said partition of flexible material attached by adhesive substance, and in either way it is possible to sterilize or thoroughly wash the bottle by passing a hose through the opening as means to inject fluid for cleansing purposes, the bottle being inverted during such operation; and it is readily seen that the under portion of the partition may be cleansed as easily as the bottom or side wall of a bottle. While I have shown the partition spaced downward from the top at a certain distance, other positions may be adopted without departing from the spirit of the invention; for instance, a portion of the mouth of the bottle may be closed in like manner and the cream poured therefrom as described when the bottle was partially filled with milk. Neither do I confine the invention to milk bottles alone, as it may be applied to other containers for milk.

Such other modifications may be employed as lie within the scope of the appended claim.

Having fully described my invention, what I claim and desire to secure by Letters Patent is:

In combination with a milk bottle, a baffle integral therewith in the interior of the bottle and intermediately positioned on the walls thereof, the baffle formed to have its upper surface in a plane parallel to the base of the bottle and its lower surface being conical in formation and the baffle to be apertured at one point adjacent the wall of the bottle to permit the cream in the milk to rise through the said aperture into the upper portion of the bottle and to prevent the flow of the milk from the lower portion of the bottle when the cream contents are discharged, substantially as shown.

In testimony whereof I affix my signature.

WINFIELD S. REIBER.